United States Patent [19]

Hannum

[11] Patent Number: 4,766,997

[45] Date of Patent: Aug. 30, 1988

[54] BEARING FOR A CONVEYOR CHAIN

[75] Inventor: Joseph R. Hannum, Norristown, Pa.

[73] Assignee: The Budd Company, Troy, Mich.

[21] Appl. No.: 946,341

[22] Filed: Dec. 24, 1986

[51] Int. Cl.⁴ .................... B65G 17/06; B65G 17/38
[52] U.S. Cl. ................................ 198/853; 474/208; 474/209; 198/851
[58] Field of Search ............... 198/851, 853; 474/207, 474/208, 209, 232, 233, 234; 384/129, 232, 263, 276, 280, 281, 103

[56] References Cited

U.S. PATENT DOCUMENTS

| | | | |
|---|---|---|---|
| 1,894,600 | 6/1928 | Schmidt | 474/208 |
| 2,909,938 | 10/1959 | Sharp | 474/208 |
| 3,795,427 | 3/1974 | Licht et al. | 384/103 |
| 4,133,585 | 1/1979 | Licht | 384/103 |
| 4,220,052 | 9/1980 | Sheldon | 198/853 X |
| 4,295,689 | 10/1981 | Licht | 384/103 |

Primary Examiner—Robert J. Spar
Assistant Examiner—Jennifer L. Doyle
Attorney, Agent, or Firm—E. M. Farrell; Herman Foster; T. I. Davenport

[57] ABSTRACT

A chain conveyor system includes a plurality of interconnected links. The links include first barrel portions connected to engage and be driven by a mechanical drive mechanism including a sprocket wheel. Removable high wear preformed coiled bands having free ends are wrapped around the barrel portions of the links to provide bearings to minimize wear on the links resulting from contact with the mechanical drive member.

3 Claims, 2 Drawing Sheets

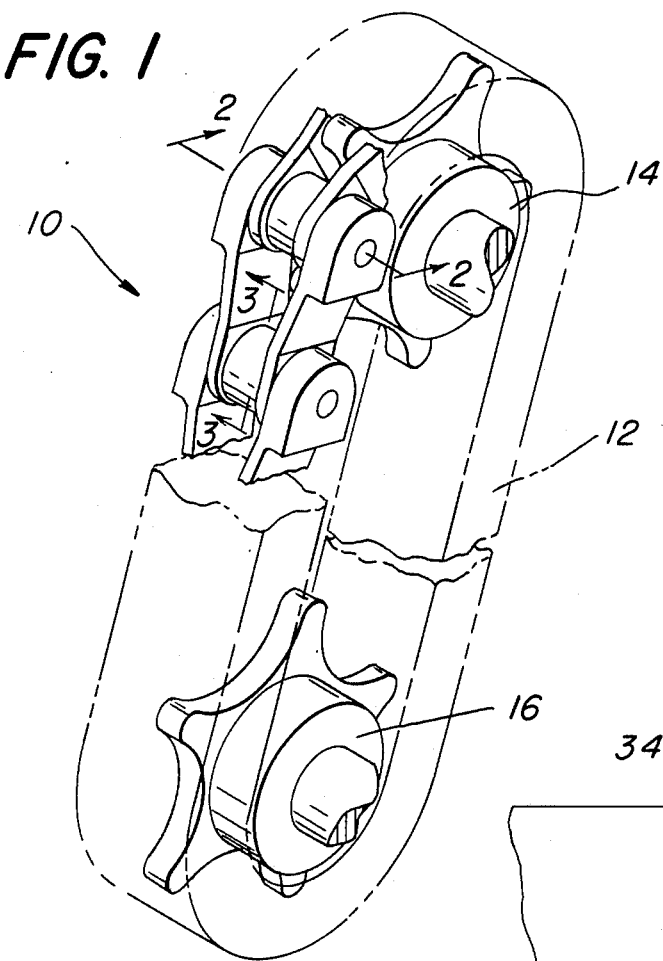
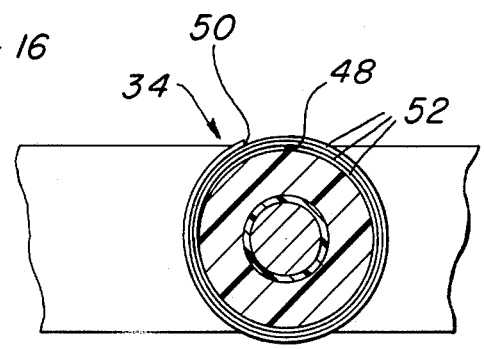

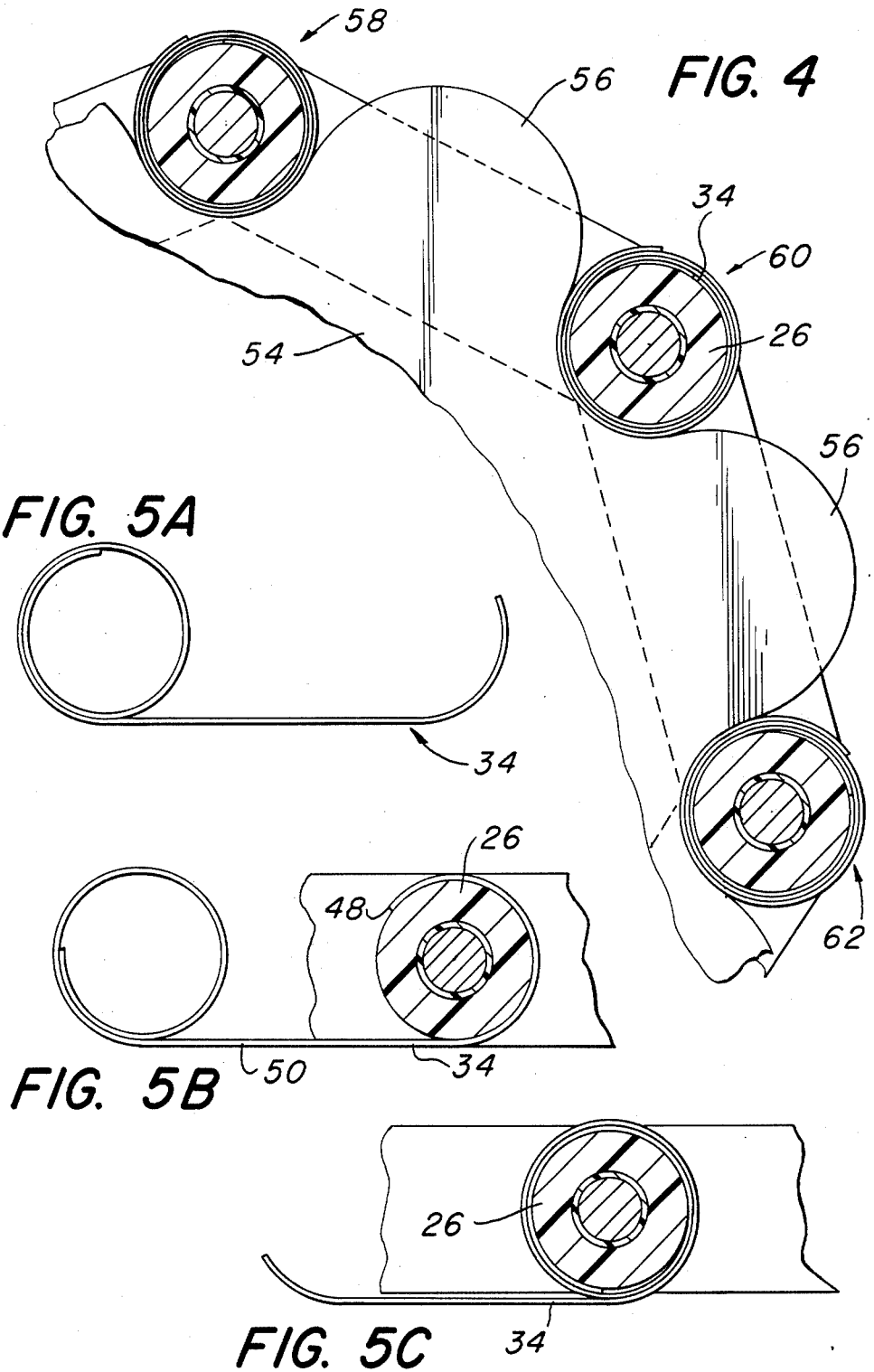

BEARING FOR A CONVEYOR CHAIN

BACKGROUND OF INVENTION

The links in conveyor chains are subject to much wear as a result of the frictional engagement with sprockets or other driving mechanisms. Various means have been employed in the past to minimize such wear. In some cases, wear-resistant low friction material, outside bushings or rollers have been put on connecting links making up the chains. In many of the cases, the chains must be disassembled before such wear-resistant material can be put on the links. In other cases, such wear-resistant material has been expensive or impractical to use.

Chain links are used extensively in drag flight conveyor systems used in water and sewerage treatment plants, for example. One such application is described in a co-pending application of Hannum, Ser. No. #722,047, filed Apr. 11, 1985. Conveyor chains in such systems are generally driven or guided by sprocket wheels. A high degree of friction between the sprocket wheels and the connecting links of the chain subject the links and the sprockets to high wear. Such high wear ultimately results in the need to replace either the links or the sprocket wheels.

Snap-on wear pads minimize wear on conveyor chains are disclosed in a patent No. 4,114,467, issued Sept. 19, 1978. A typical conveyor link which may be made of plastic is described in a patent No. 3,881,593, issued May 6, 1975.

The present invention relates to a novel bearing element for links in a conveyor chain. The bearing involves a type of structure which has been used in a number of applications involving springs, for example. These structures comprise metal strips which are wound into coils so that when they are unstressed they take the form of tightly wound spirals. When these springs are unwound and then released, the elements have a characteristic of returning to their original shapes. Such springs have been used to provide relatively constant pressure and have been used in steel tapes, pull-down shades, brush holders and the like.

Other characteristics of the coiled springs are dependent upon the particular design requirements. No claim is being made to a spring element or the process of making it, except as it relates to a bearing member to be described.

BRIEF SUMMARY OF THE INVENTION

In accordance with the present invention a conveyor chain is guided or driven by one or more sprocket wheels. A plurality of interconnected plastic links form the chain. Each of the links include circular projecting portion or barrel at one end and a pair of projecting connecting portions at the opposite end spaced to receive therebetween and connected to the circular barrel of an adjacent link. Removable high wear metal bands having free ends are wrapped around and are preformed to coil tightly around barrels of the links to minimize the wear of the links which normally result from frictional engagement with the sprockets.

Other objects and advantages of the present invention will be apparent and suggest themselves to those skilled in the art, from a reading of the following specification and claim taken in conjunction with the accompanying drawings.

BRIEF DESCRIPTION OF THE DRAWINGS

FIG. 1 illustrates a portion of chain conveyor, partly broken away, of the type which may be used in a water treatment system;

FIG. 2 is a top view taken generally along lines 2—2 of FIG. 1 with one of the links being partly broken away and partly in cross-section.

FIG. 3 is a view partly in cross-section taken along lines 3—3 of FIGS. 1 and 2, illustrating a coiled bearing around one of the sections of a link;

FIG. 4 is an enlarged view illustrating the frictional contact between bearings on links with a sprocket wheel, and FIGS. 5a, 5b and 5c illustrate steps of installing a bearing around the barrel of a typical link, in accordance with the present invention.

DESCRIPTION OF THE INVENTION

Referring to FIG. 1, a portion of a chain conveyor system 10 includes a conveyor chain 12 driven by a sprocket wheel 14 which may be driven by a motor, not illustrated. Sprocket wheel 16 may be an idler. In a drag flight conveyor used in a water and sewerage, for example, flight elements may be connected to a pair of spaced chains. Only a single chain 12 is illustrated in FIG. 1. In such a drag flight chain conveyor the links of the chains are exposed to high wear by chemicals in the system as well as wear resulting from friction between the chain links and sprocket wheels.

Referring to FIGS. 2 and 3, the chain 12 includes a plurality of similar links 22 and 24. In one embodiment of the present invention, the links 22 and 24 may be made of Nylon 6 or other suitable plastic material. The links 24 and 26 are similar to those described in U.S. Pat. No. 3,881,593, although they may take different forms.

The links in the chain 12 are identical and therefore only the link 24 will be described in detail. The link 24 includes a front portion or barrel 26 at one end which is circular in shape and a pair of end projecting portions 27 and 28 at the other end. Elongated side bar portions 30 and 32 integrally connect the barrel portion 26 to the end portions 27 and 28.

A removable preformed coiled band 34 is wrapped around and dimensioned to tightly engage the circular barrel portion 26 to provide a bearing for the link 24. The adjacent barrel portions of the links include similar coiled bands 34.

The circular barrel portion 26 is disposed transversely between the end projecting portions 27 and 28. A connecting pin 36 is inserted through apertures, such as aperture 38, in the portions 27 and 28, with only one of the apertures being illustrated in FIG. 2. The barrel portion 26 also includes a central aperture 40.

When a pin 36 is inserted through the apertures 38 and 40 the adjacent links are held together by a screw 42 which fixes the pin in place. With the connecting pins, such as the connecting pin 36, in place, adjacent links, such as links 22 and 24, are free to pivotally move with respect to each other during movement of the conveyor chain.

The axial length of the circular barrel portion 26 is equal to the distance between the portions 44 and 46 which form the ends of the arms 30 and 32. The inside diameter of the coiled band 34 is substantially the same as the diameter of the barrel portion 26, which is disposed between the end sections 44 and 46.

As illustrated in FIG. 3, the coiled band 34 comprises a pair of free ends 48 and 50. This permits the coiled band to be manually uncoiled to permit installation on the barrel portion of a link. When one of the ends of the bearing or band is inserted around the barrel portion 26 the band is uncoiled manually with the ends of the band 34 separated from the main body of the band to start the wrapping around the circular portion 26. Once started, the coiled band is rotated until the band is wrapped around the circular portion 26 in relatively tight relationship. These steps are illustrated in FIGS. 5a, 5b and 5c.

As illustrated in FIG. 3, the band may comprise a plurality of individual coils 52 which are preformed to normally assume the shape illustrated.

Referring to FIG. 4, a sprocket wheel 54 includes a plurality of teeth 56 to engage a plurality of bearings 34 on links 58, 60 and 62. The bearings 34 surround the barrel or middle portions 26 of the links. When the chain is being moved, there is no direct frictional contact between the links of the chain and the sprocket wheel because of the high wearing bearing 34 disposed between the links and the sprocket wheel.

Referring to FIGS. 5a, 5b and 5c, the steps involved in installing the band 34 around the barrel portion 26 of the link 24 (FIG. 3) are illustrated. It is noted that the coiled band is wound oppositely to that illustrated on FIG. 3.

The coils of the band 34 may be manually uncoiled (FIG. 5a) with the end of the band 48 being wrapped around the barrel portion 26 of a link (FIG. 5b). A continued wrapping of the coils of the band 34 around the barrel portion 26, moves the end 48 further more around the barrel portion 26 and causes the inner coils to be held on the barrel portion. The coils of the band 34 may then be rolled on the barrel portion 26 (FIG. 5c). Finally, the band 34 is completely wrapped around the barrel 26, as illustrated in FIG. 3. The band may be installed manually or with the use of suitable tools.

A preferred embodiment of the band 34 is that it be made of stainless steel because of the high wear properties. In a typical application, the band of bearing element 34 may have an inside diameter of 0.850 wide and an outside diameter of 0.012" thick. The band 34 may typically include 3 coils. As mentioned, the links may comprise preferable reinforced Nylon 6. However, the number of coils may be more or less than three. The bearing material in some cases may comprise high wear plastic material.

The present invention has provided a novel bearing which may be retro-fitted to existing systems. For example, when links in a chain have been subject to excessive wear resulting from high frictional operation with sprockets, it is not necessary to shut down the operation for long periods of time to remove the links. The bearing elements of the present invention may be readily inserted around the worn barrel portion of the links.

The present invention has been described in connection with merely one type of link. It is apparent that the configuration of the links may take a wide variety of different forms including circular or barrel portions normally subject to wear as a result of contact from mechanical drives.

What is claimed is:

1. In a conveyor system having a mechanical drive member for driving a chain,
    (a) a plurality of interconnected links forming said chain and including a barrel shaped portion for frictionally contacting and driven by said mechanical drive member,
    (b) removable high wear strips of a width substantially equal to the axial length of said barrel portions and preformed into coiled bearing bands, adapted to be wrapped around and tightly engage said barrel shaped portions to form bearings on said plurality of interconnected links, and
    (c) each of said coiled bands having free ends and including radially overlapping layers.

2. The invention as set forth in claim 1 wherein said bands comprise stainless steel.

3. The invention as set forth in claim 2 wherein said conveyor system comprises a drag flight conveyor for use in a water and sewerage treatment system.

* * * * *